(12) United States Patent
Wong et al.

(10) Patent No.: US 6,182,252 B1
(45) Date of Patent: Jan. 30, 2001

(54) METHOD AND SYSTEM FOR EFFICIENT PACKET DATA TRANSPORT

(75) Inventors: Steven Wong, Long Beach; Roger Knobbe, Torrance, both of CA (US)

(73) Assignee: Wonderware Corporation, Irvine, CA (US)

( * ) Notice: Under 35 U.S.C. 154(b), the term of this patent shall be extended for 0 days.

(21) Appl. No.: 09/273,368

(22) Filed: Mar. 22, 1999

Related U.S. Application Data

(60) Provisional application No. 60/103,363, filed on Oct. 7, 1998.

(51) Int. Cl.[7] .................................................. G06F 9/06
(52) U.S. Cl. ............................................................ 714/708
(58) Field of Search .............................. 714/47, 48, 708, 714/704

(56) References Cited

U.S. PATENT DOCUMENTS

| | | | |
|---|---|---|---|
| 5,243,594 | * 9/1993 | Dasch et al. | 370/61 |
| 5,432,903 | 7/1995 | Frid-Nielsen | 395/361 |
| 5,440,741 | * 8/1995 | Morales et al. | 395/650 |
| 5,764,155 | 6/1998 | Kretesz | 340/825.08 |
| 5,815,703 | 9/1998 | Copeland et al. | 395/613 |
| 5,822,527 | 10/1998 | Post | 395/200 |
| 5,933,601 | 8/1999 | Fanshier et al. | 395/200 |
| 5,974,410 | 10/1999 | Copeland et al. | 707/103 |

* cited by examiner

*Primary Examiner*—Albert De Cady
*Assistant Examiner*—Esaw Abraham
(74) *Attorney, Agent, or Firm*—Cooley Godward LLP; Kevin J. Zimmer

(57) ABSTRACT

A system and method for regulating data transmission between a source node and a destination node is disclosed herein. The present method contemplates monitoring system performance so as to detect when the system enters an overloaded state. Such detection may be effected by, for example, determining the extent of the time interval during which instructions are retained in a queue at the destination node awaiting execution. When this interval exceeds a maximum queuing time, the system is deemed to be in an overloaded state. Upon entry into an overloaded state, data transmission from the source node is suspended pending recovery of the system from the overloaded state. In a preferred implementation, overload probe messages are periodically inserted into a message queue at the destination node. When such an overload probe message is determined to have been retained in the message queue in excess of the maximum queuing time, the system is deemed to be in an overloaded state and data transmission is suspended as described above. If it is subsequently determined that an overload probe message has been retained in the message queue for less than the maximum queuing time, data transmission from the source node is resumed.

16 Claims, 3 Drawing Sheets

METHOD AND SYSTEM FOR EFFICIENT PACKET DATA TRANSPORT

This application claims benefit to provisional application 60/103,363 filed Oct. 7, 1998.

FIELD OF THE INVENTION

This invention relates generally to methods of data communication and, more particularly, to a method and system for facilitating efficient, high-volume data transport.

BACKGROUND OF THE INVENTION

The operation of industrial equipment such as assembly lines, machine tools and processing equipment is often governed by an automation controller in accordance with a stored program. In conventional automation controllers, the control program is stored in a memory and includes instructions which are read out in rapid sequence and executed to examine the condition of selected sensing devices on the controlled equipment, or to energize or de-energize selected operating devices on the controlled equipment contingent on the status of one or more of the examined sensing devices.

Large controllers typically consist of a number of modules with different functions assigned to each module. For example, one module may execute the user control program, another may interface the controller to the remote sensing and operating devices, and yet another module may control communications with a host computer via a local area network. This arrangement permits one or more human operators to monitor and control an industrial process via computer workstations.

When a computer workstation in an industrial control system is initialized, it may become a "subscriber" to measurements provided by a number of different sources. Each measurement source with which the workstation is associated as a subscriber will typically provide a current measurement value, and will subsequently transmit an updated value in response to each change in the measured parameter. A measurement source will often supply more than a single type of measurement to a given subscriber (i.e., destination workstation). For example, the temperature and water level of a water tank could be provided by a single measurement source and delivered to the same subscriber.

In order to make efficient use of available data transport bandwidth, multiple measurements are commonly bundled together into packets. In accordance with certain data transport protocols, a measurement source will buffer measurement data until either a complete packet is ready for transmission to the same subscriber, or until the first buffered measurement has been held in excess of a predefined time period. When a packet is eventually sent to a subscriber, the measurement source waits for an acknowledgement from the subscriber prior to sending additional packets. That is, additional measurements are not sent to the subscriber between the time at which a packet is sent until receipt of an acknowledgement. This results in relatively inefficient use of available transport bandwidth, since some waiting period occurs following the sending of each packet. In addition, the waiting period increases the average latency (i.e., the average elapsed time between the taking of a measurement and subsequent delivery of measurement data) associated with the transport of measurement data to a subscriber.

Another consideration in the design of current industrial control systems is the potential for the flow of high volumes of data and message traffic between modules. For example, in particular control systems a temperature reading may be transmitted from its source to multiple computer workstations for real-time display. A human operator may be similarly presented with real-time data from hundreds of sensors distributed throughout a factory. In addition, certain applications may be required to subscribe to and effect centralized processing of sensor data originating from numerous local and geographically distant sources.

These scenarios raise the possibility that a particular module or workstation may be overwhelmed when measurement data is received faster than it can be processed. For example, a workstation may become overloaded if it is incapable of displaying measurement data at the rate it is received. Even when data is arriving at a rate less than the maximum rate at which it may be displayed, little or no processing capacity may remain available to carry out other necessary functions (e.g., responding to user commands made via a keyboard or mouse). In industrial automation environments, rapid response to operator commands and the like is critical to maintaining control of the subject industrial process.

One potential solution to the overload problem discussed above is to simply not send data continuously to a particular destination (e.g., a workstation), but to instead require that the destination reply with a "handshaking" acknowledgment upon completing processing of each received measurement packet. Unfortunately, this results in transport inefficiencies at low data transmission rates, since each new packet will not be sent until an acknowledgment is received. That is, each received data packet will be separated by an interval equivalent to the round-trip time required for a packet to be transported between the source and destination.

Another potential approach to overcoming the overload problem could involve configuring a destination to periodically send messages indicative of the amount of data which has been processed since establishment of the data connection. One drawback of this approach is that bandwidth is consumed by the periodic messages from the destination even in the absence of an overload condition. If it is attempted to conserve bandwidth by sending such periodic messages only infrequently, it is possible that an overload condition will develop during one of the intervals between messages.

The overload problem could also be potentially solved by buffering measurements received at the destination to memory. Processing or display of the received data could then be performed asynchronously relative to receipt of the data. However, in the event of a continuing overload condition the size of the buffer will tend to increase without limit. As a result of this increase all available memory could be consumed, potentially resulting in the occurrence of a system crash or other undesirable system performance. In addition, the average data latency tends to increase in proportion to the quantity of buffered data.

SUMMARY OF THE INVENTION

Briefly, the present invention is directed to a system and method for regulating data transmission between a source node and a destination node within a data communication system. The present invention contemplates monitoring performance of the system so as to detect when the system enters an overloaded state. In an exemplary embodiment such detection is effected by determining the extent of the time interval during which instructions are retained in a queue at the destination node awaiting execution. When this interval exceeds a maximum queuing time, the system is deemed to be in an overloaded state. Upon entry into an overloaded state, data transmission from the source node is suspended pending recovery of the system from the overloaded state.

In a preferred embodiment overload probe messages are periodically inserted into a message queue at the destination node. When such an overload probe message is determined to have been retained in the message queue in excess of the maximum queuing time, the system is deemed to be in an overloaded state and data transmission is suspended as described above. If it is subsequently determined that an overload probe message has been retained in the message queue for less than the maximum queuing time, data transmission from the source node is resumed.

DETAILED DESCRIPTION OF THE INVENTION

Figure 1:
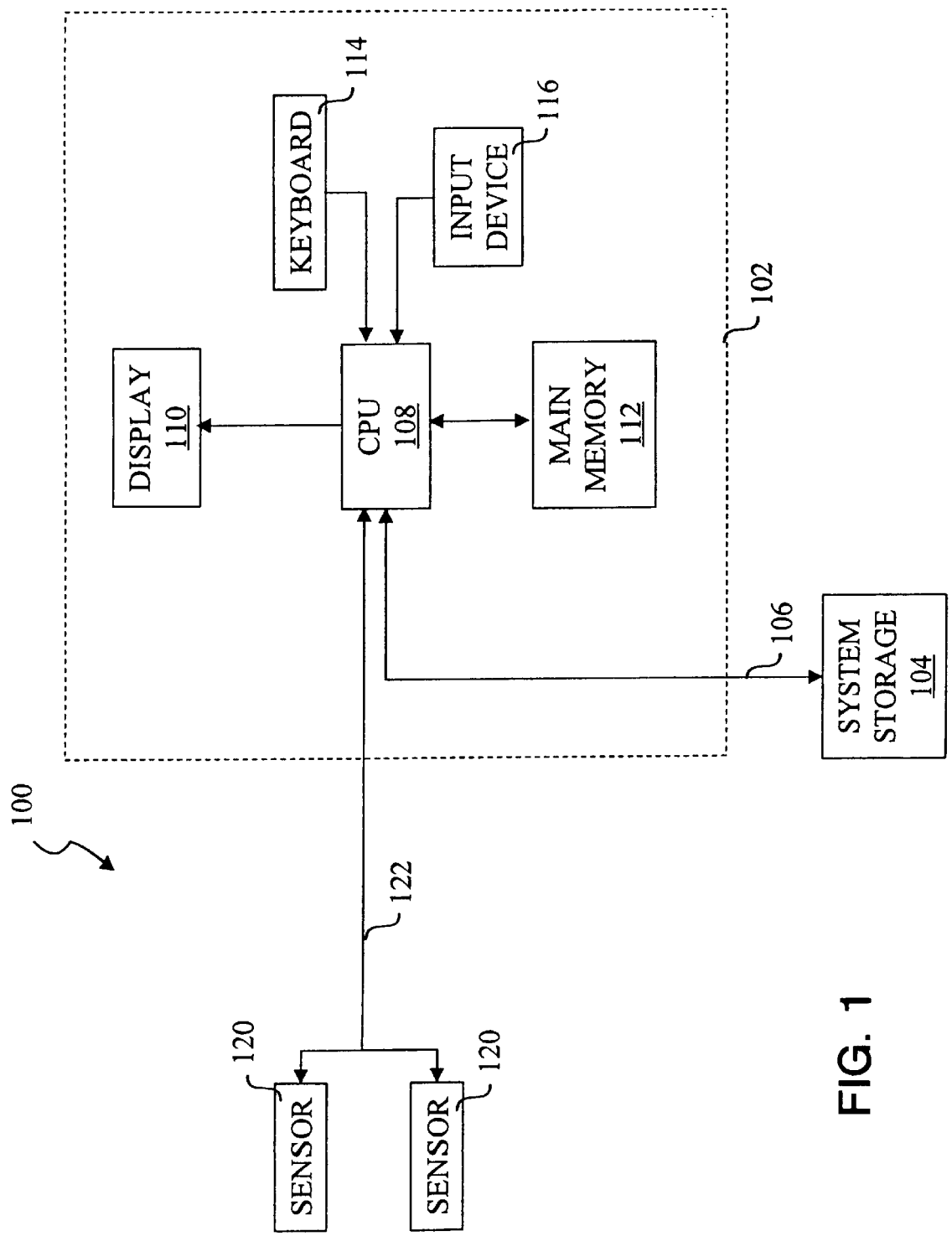
FIG. 1 is a block diagram of a computer system in which the present invention may be implemented.

FIG. 1 is a block diagram of a computer system 100 in which the present invention may be implemented. The computer system 100 includes a computer workstation 102 that communicates with a system storage unit 104 over network 106. The system storage unit 104 comprises a direct access storage device, such as magnetic disk storage, in which data files are stored. The workstation 102 includes a central processing unit ("CPU") 108, a display 110, and a main memory 112. The CPU 108 operates in response to user commands, which it receives via a keyboard 114 or a display mouse 116. The computer workstation 102 can communicate with one or more other user stations or a network server unit over the network 106.

The main memory 112 contains a variety of data structures and information, including an operating system, application programs, program objects, and user data. The main memory is represented as a single entity, but those skilled in the art will appreciate that the main memory can comprise a combination of random access memory ("RAM"), hard disk drives, optical disk drives, and other storage devices containing logically segmented storage locations. The main memory includes a computer program containing a sequence of program instructions whose execution implements the present invention.

The operating system contained in the memory 112 supports an object-oriented programming environment for the execution of object-oriented programs, such as those written in, for example, the C++ programming language. Accordingly, the memory contains program objects that are data structures of an object-oriented programming language. Application programs are invoked, or launched, by a user through the keyboard 114 or graphical input device 116. The application programs can be written in a variety of languages, including C++.

The display 110 comprises a display device such as a video terminal that displays computer output and indicates system operations. Display objects can be pictured on the display and the user can designate data operations on the display by using the mouse 116 or equivalent graphical user input device.

In an exemplary implementation the computer system 100 send commands to, and receive data from, one or more industrial sensor or process control devices 120 via a data bus 122. The state of each such device 120 is reflected by the value of an associated tag, each of which may be a parameter of the container application. In the exemplary implementation the container application comprises an industrial automation software program, such as the InTouch program module developed by Wonderware Corporation of Irvine, Calif. The Wonderware Intouch module includes a tool kit for building screens and interfaces, and a graphical user interface for monitoring and controlling the devices 120. For example, in the context of electrical distribution the software toolkit of the Wonderware Intouch module enables rapid development of three dimensional representations of electrical distribution switchgear. The switchgear elevational representations have logical connections to the switchgear devices. An elevation can be modified to any dimensions with an essentially infinite number of combinations and arrangements of meters and protection devices to quickly and accurately represent a customer's switchgear. In addition, a tabular representation of metering and setup/set point information is generated automatically with the appropriate database server links established. The Wonderware Intouch module is disposed to provide similar representations and accompanying database links in other areas of industrial automation and control.

Figure 2:
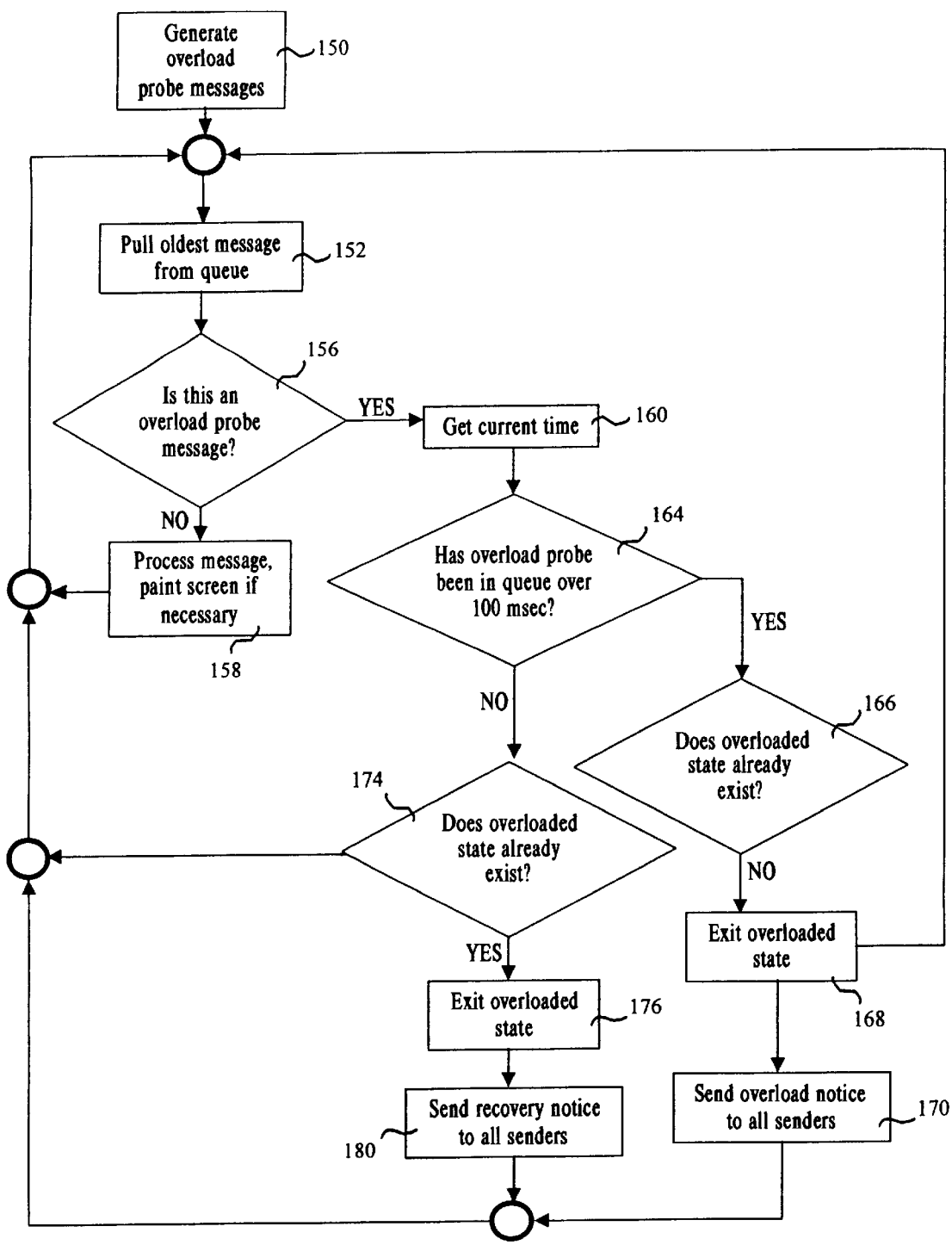
FIG. 2 is a flowchart representing a message processing subroutine associated with a workstation application program disposed to receive measurement or other data from one or more sensors.

FIG. 2 is a flowchart representing a message processing subroutine associated with an application program at the workstation 102 configured to receive measurement or other data from one or more sensors 120. It is initially observed that in environments governed by the Microsoft Windows operating system, each keyboard and mouse press or selection action generates a message, which passes through a message queue of the associated application program. If CPU 108 becomes overloaded, such messages will begin to accumulate in the message queue of each active application program without being processed.

In step 150, overload probe messages are generated by the message processing subroutine of an application program and placed in the message queue or equivalent structure associated with the application program. The overload probe messages are interspersed with the messages also being provided to such message queues, and each includes information as to its precise (e.g., to within a millisecond) time of insertion into a message queue. In step 152 the application program retrieves the oldest remaining message in the message queue, and determines whether the retrieved message is an overload probe message (step 156). If the retrieved message is not an overload probe message, the application program continues with normal processing of the retrieved message (step 158).

When the retrieved message is an overload probe message, the message processing subroutine obtains the current time (step 160). In step 164 it is determined whether the retrieved overload probe message has been in the message queue in excess of a predetermined time period (e.g., 100 msec.) by comparing the current time to the time of insertion of the probe into the message queue. The predetermined time period is selected to be sufficiently small that a user of workstation 102 will not experience significantly degraded performance (e.g., noticeable delays in response following mouse or keyboard entries). If the overload probe message has been queued in excess of such time period, it is determined whether the message subroutine has already deemed an overload condition to exist (step 166). If an overload condition already exists, no further processing based upon the retrieved overload probe message is conducted. If such an overload condition has not yet been deemed to exist, the message processing subroutine deems an overload condition to exist (step 168). Next, the message processing subroutine generates an overload notice, which is sent by the workstation 102 to all devices 120 providing measurement or other data to the workstation 102 (step 170).

If it is determined that the retrieved overload probe message has been in the message queue less than the predetermined amount of time (step 164), then the message processing subroutine determines whether an overload condition has already been deemed to exist (step 174). If an overload condition does not exist, no further processing based upon the retrieved overload probe message is conducted. If such an overload condition is in existence, the message processing subroutine deems that the overload condition no longer exists (step 176). Next, the message processing subroutine generates an overload recovery notice, which is sent by the workstation 102 to all devices 120 providing measurement or other data to the workstation 102 (step 180).

Figure 3:
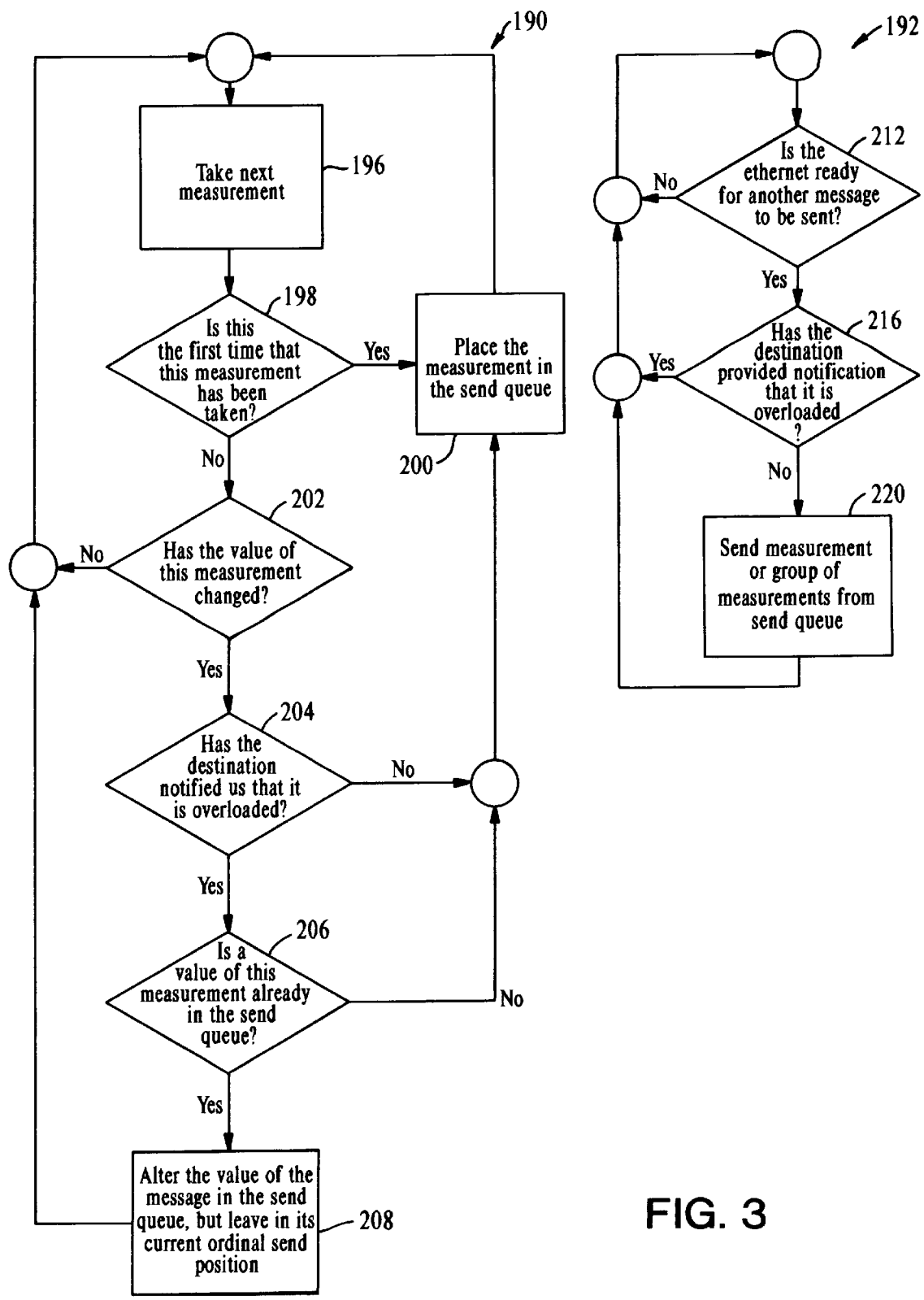
FIG. 3 is a flowchart representative of the processing performed in accordance with the invention by first and second execution threads of a program operative within a sensing device in communication with the workstation application program.

FIG. 3 is a flowchart representative of the processing performed in accordance with the invention by first and second execution threads 190 and 192 within a device 120 engaged in sending measurement or other data to the workstation 102. In a preferred implementation the first and second execution threads 190 and 192 operate independently and in parallel within the device 120. Referring to the first execution thread 190, in step 196 the device 120 performs a measurement of the parameter being monitored (e.g., temperature). Next, in step 198 it is determined whether this instant measurement corresponds to the initial measurement of the parameter being monitored. If yes, the instant measurement is placed in a send queue for transmission to the workstation 102 (step 200). If the instant measurement is not such an initial measurement, it is determined whether the instant measurement has changed from the value of the previous measurement taken (step 202). If no, no further processing is performed by the first execution thread 190 with respect to the instant measurement.

If the value of the instant measurement differs from the previous measurement (step 202), it is determined whether an overload notice has been received from the workstation 102 (step 204). If not, the instant measurement is placed in the send queue for transmission to the workstation. If an overload notice has been received and no overload recovery notice has been subsequently received, then it is determined whether a measurement of the parameter of interest exists within the send queue (step 206). If not, the instant measurement is placed in the send queue. If such a measurement does exist within the send queue, then such existing measurement is replaced by the instant measurement in the same ordinal position within the send queue (step 208).

Referring to the second execution thread 192, in step 212 it is determined whether data bus 122 is ready for the device 120 to send another measurement or group of measurements. If not, step 212 is performed again after some predefined time interval. If the data bus 122 is so ready, it is determined whether an overload notice has been received from the workstation 102 and no overload recovery notice has been subsequently received (step 216). If yes, step 212 is performed again after some predefined time interval. If an overload condition does not exist, a measurement or group of measurements from the send queue is transmitted from the device 120 to the workstation 102 via data bus 122 (step 220).

In alternate embodiments of the present invention, the existence of an overload condition at a particular module or workstation in receipt of measurement data is determined other than through monitoring of the latency of queued messages. For example, it has been found that when an overload condition exists, the percentage of physical memory being utilized tends to increase primarily due to data arriving at a rate greater than it can be processed. Accordingly, in one alternate embodiment such an overload condition is detected by monitoring the percentage of physical memory being utilized. Once an overload condition has been so detected, processing proceeds in the manner contemplated by the preferred embodiment upon like detection of an overload condition (i.e., upon encountering an overload probe message retained within the message queue in excess of a predetermined time interval). In another alternate embodiment, an overload condition is deemed to have arisen when the percentage of available CPU cycles being consumed on non-idle tasks exceeds a predefined threshold. An overload condition may also be deemed to have occurred upon the refresh rate of the monitor 110 decreasing by more than a predefined amount relative to a nominal refresh rate. In these latter two implementations, processing also continues in the manner contemplated by the preferred embodiment upon like detection of an overload condition.

Although the above application has been described primarily in terms of particular techniques for detecting the existence of system and for accordingly adjusting the flow of data transmission, those skilled in the art will be able to develop analogous techniques based upon the teachings herein. Thus the application is meant only to be limited by the scope of the appended claims.

What is claimed is:

1. In a system in which messages are generated upon the occurrence of predefined events and accumulated within a message queue at a destination node, a method for regulating data transmission comprising the steps of:

transmitting data from a source node to said destination node;

inserting overload probe messages into said message queue, each said overload probe message including information specifying a time of insertion of said overload probe message into said message queue;

comparing said time of insertion of at least one of said overload probe messages to a present time in order to determine a retention time of said at least one of said overload probe messages in said message queue; and suspending transmission of said data from said source node when said retention time exceeds a predetermined time period.

2. The method of claim 1 further including the step of resuming transmission of said data from said source node when a subsequent one of said overload probe messages is retained in said message queue for less than said predetermined time period.

3. The method of claim 1 further including the steps of:

causing said system to enter an overloaded state when said at least one of said overload probe messages is retained in said message queue in excess of said predetermined time period, and sending an overload notice to said source node.

4. The method of claim 3 further including the steps of:

causing said system to exit said overloaded state when a subsequent one of said overload probe messages is retained in said message queue for less than said predetermined time period, and sending a recovery notice to said source node.

5. The method of claim 4 further including the step resuming transmission of data from said source node in response to receipt at said source node of said recovery notice.

6. A method for regulating the transmission of data from a source node to a destination node, said method comprising the steps of:

inserting overload probe messages into a message queue, each said overload Probe message including information specifying a time of insertion of said overload probe message into said message queue;

comparing said time of insertion of at least one of said overload probe messages to a present time in order to determine a retention time of said at least one of said overload probe messages in said message queue;

generating an overload notice when said retention time exceeds a predetermined time;

placing data within a send queue at said source node;

retaining said data within said send queue in response to receipt at said source node of an overload notice from said destination node; and transmitting said data in response to receipt at said source node of a recovery notice from said destination node.

7. The method of claim 6 further including the steps of:

performing a measurement of a parameter at said source node, thereby generating measurement data, determining whether any of said data within said send queue corresponds to a previous measurement of said parameter, and placing said measurement data in the send queue if it is determined that none of said data within said send queue corresponds to said previous measurement of said parameter.

8. The method of claim 7 further including the step of withholding said measurement data from said send queue if certain of said data within said send queue corresponds to a substantially identical value of said measurement data.

9. The method of claim 6 further including the steps of:

performing a measurement of a parameter at said source node, thereby generating measurement data, determining whether any of said data within said send queue corresponds to a previous measurement of said parameter, and replacing any data within said send queue with said measurement data if (i) it is determined that said measurement data corresponds to said previous measurement of said parameter, and (ii) an overload notice has not been received at said source node without a recovery notice being subsequently received at said source node.

10. A data communication system within which messages are generated upon the occurrence of predefined events and accumulated within a message queue at a destination node, said data communication system comprising:

means for inserting overload probe messages into said message queue, each said overload probe message including information specifying a time of insertion of said overload probe message into said message queue;

means for comparing said time of insertion of at least one of said overload probe messages to a present time in order to determine a retention time of said at least one of said overload probe messages in said message queue; and a source node nominally operative to transmit data to said destination node, said source node suspending transmission of said data to said destination node when said retention time exceeds a predetermined time period.

11. The communication system of claim 10 wherein said source node is operative to resume transmission of said data to said destination node when a subsequent one of said overload probe messages is retained in said message queue for less than said predetermined time period.

12. The communication system of claim 10 wherein said destination node further includes:

means for causing said system to enter an overloaded state when said at least one of said overload probe messages is retained in said message queue in excess of said predetermined time period, and means for sending an overload notice to said source node.

13. The communication system of claim 12 wherein said destination node includes:

means for causing said system to exit said overloaded state when a subsequent one of said overload probe messages is retained in said message queue for less than said predetermined time period, and means for sending a recovery notice to said source node.

14. The communication system of claim 13 wherein said source node is operative to suspend transmission of said data in response to receipt of said overload notice and to resume transmission of said data in response to receipt of said recovery notice.

15. In a system having a source node in communication with a destination node, a method for regulating the transmission of data from said source node to a destination node comprising the steps of:

inserting overload probe messages into a message queue, each said overload probe message including information specifying a time of insertion of said overload probe message into said message queue;

comparing said time of insertion of at least one of said overload probe messages to a present time in order to determine a retention time of said at least one of said overload probe messages in said message queue; and suspending transmission of said data from said source node when said retention time exceeds a predetermined time.

16. The method of claim 15 further including the step of resuming said transmission of said data in response to receipt at said source node of a recovery notice from said destination node, said recovery notice being generated in response to retention in said message queue of one of said overload probe messages for less than said predetermined time.

* * * * *